United States Patent
Kong et al.

(10) Patent No.: US 12,187,344 B2
(45) Date of Patent: Jan. 7, 2025

(54) VEHICLE FRONT PILLAR

(71) Applicants: HYUNDAI MOTOR COMPANY, Seoul (KR); KIA CORPORATION, Seoul (KR)

(72) Inventors: Nak Kyoung Kong, Seongnam-si (KR); Jong Min Park, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 283 days.

(21) Appl. No.: 17/883,231

(22) Filed: Aug. 8, 2022

(65) Prior Publication Data

US 2023/0060693 A1    Mar. 2, 2023

(30) Foreign Application Priority Data

Aug. 24, 2021   (KR) .................. 10-2021-0111407

(51) Int. Cl.
| | |
|---|---|
| *B62D 25/04* | (2006.01) |
| *B60J 1/00* | (2006.01) |
| *B60J 1/02* | (2006.01) |
| *B60J 10/70* | (2016.01) |

(52) U.S. Cl.
CPC .............. *B62D 25/04* (2013.01); *B60J 1/006* (2013.01); *B60J 1/008* (2013.01); *B60J 1/02* (2013.01); *B60J 10/70* (2016.02)

(58) Field of Classification Search
CPC ... B60J 1/02; B60J 10/70; B60J 1/008; B62D 25/04
USPC .................... 296/93, 96.21, 193.06
See application file for complete search history.

(56) References Cited

U.S. PATENT DOCUMENTS

| | | | | |
|---|---|---|---|---|
| 4,035,017 | A * | 7/1977 | Griffin ..................... | B60J 10/70 296/93 |
| 6,340,200 | B1 * | 1/2002 | Enomoto ................. | B60R 21/34 296/203.02 |
| 6,340,203 | B2 * | 1/2002 | Enomoto ............... | B62D 25/04 296/203.02 |
| 8,894,133 | B2 * | 11/2014 | Chai ....................... | B62D 25/04 296/203.02 |
| 10,315,701 | B2 * | 6/2019 | Kim ........................ | B62D 25/06 |
| 10,703,178 | B2 * | 7/2020 | Boettger ................... | B60J 1/006 |
| 10,766,541 | B2 * | 9/2020 | Ikeda ......................... | B60J 1/02 |
| 11,142,255 | B2 * | 10/2021 | Ikeda ..................... | B60R 13/025 |
| 2018/0273106 | A1 * | 9/2018 | Ikeda ..................... | B62D 25/04 |
| 2023/0264542 | A1 * | 8/2023 | Nagliati ................ | B60R 13/025 296/84.1 |
| 2023/0373275 | A1 * | 11/2023 | Kurioka ................... | B60J 1/004 |

FOREIGN PATENT DOCUMENTS

| | | |
|---|---|---|
| KR | 100831501 B1 | 5/2008 |
| KR | 20140091510 A | 7/2014 |

* cited by examiner

*Primary Examiner* — Jason S Morrow
(74) *Attorney, Agent, or Firm* — Lempia Summerfield Katz LLC

(57) ABSTRACT

A vehicle front pillar has a side outer panel located on a side of a vehicle and a side outer inner panel spaced apart from the side outer panel by a predetermined space. A reinforcing member is located between the side outer panel and the side outer inner panel. A windshield is located to surround at least a portion of an outer portion of the reinforcing member. A fastening unit is located between a distal end of the side outer panel and the windshield.

12 Claims, 4 Drawing Sheets

VEHICLE FRONT PILLAR

CROSS REFERENCE TO RELATED APPLICATION

The present application claims priority to Korean Patent Application No. 10-2021-0111407, filed Aug. 24, 2021, the entire contents of which are incorporated herein for all purposes by this reference.

BACKGROUND

Field of the Disclosure

The present disclosure relates generally to a vehicle front pillar and, more particularly, to a vehicle front pillar including a pillar structure mounting a windshield on a vehicle body such that an improved view is provided through right and left side edges of the windshield and including a blocking structure preventing external rainwater from infiltrating.

Description of the Related Art

Generally, a vehicle pillar serves to support a vehicle roof while connecting the vehicle roof to a vehicle body. A plurality of such vehicle pillars is disposed in the longitudinal direction of a vehicle.

Front pillars located on the front portions of the vehicle in the longitudinal direction of the vehicle are referred to as A pillars or A posts. The front pillars serve to support both side portions of a windshield in the transverse direction of the vehicle and to support the leading end portions of the roof in the longitudinal direction of the vehicle.

Since the vehicle front pillars are located in front of a driver seated in the driver's seat while facing forward, the front pillars inevitably obstruct the forward view of the driver, thereby forming blind spots so that the driver cannot see in front of the vehicle.

Thus, the blind spots may increase a danger of an accident occurring when a vehicle turns right or left.

Accordingly, when the size of the blind spots formed by the front pillars is reduced by minimizing the size of the font pillars, the risk of an accident may also be reduced.

However, the front pillars must have a suitable level of strength to support the windshield and the roof. In addition, the front pillars are also required to have an intended level of strength to properly cope with a front collision of the vehicle. Thus, the size of the front pillars cannot be reduced freely, i.e., without consequence.

Recently, as more vehicles are using a windshield providing an increased forward view, repositioning of the front pillars is essentially required.

Accordingly, it is required to design front pillars so as not to obstruct the driver's forward view as much as possible while also having a suitable level of strength for properly supporting the windshield glass and the roof and having a suitable level of strength for properly coping with a front collision.

The foregoing is intended merely to aid in understanding the background of the present disclosure. The foregoing is not intended to mean that the present disclosure falls within the purview of the related art that is already known to those having ordinary skill in the art.

SUMMARY

Accordingly, the present disclosure has been made, keeping in mind the above problems occurring in the related art, and has been made in an effort to provide a front pillar configured to obtain an improved view through both side edges of a windshield.

The present disclosure also provides a front pillar structure in which a trim portion is configured to integrally surround a side outer panel and an injected portion.

The objectives of the present disclosure are not limited to the aforementioned description. Other objectives and advantages of the present disclosure that are not explicitly described should be understood from the description provided hereinafter and, more clearly, from embodiments of the present disclosure. In addition, the objectives of the present disclosure may be realized by elements described in the claims and combinations thereof.

In order to achieve the above objectives, according to one aspect of the present disclosure, a vehicle front pillar is provided.

According to an embodiment of the present disclosure, the vehicle front pillar may include: a side outer panel located on a side of a vehicle; a side outer inner panel spaced apart from the side outer panel by a predetermined space; a reinforcing member located between the side outer panel and the side outer inner panel; a windshield located to surround at least a portion of an outer portion of the reinforcing member; and a fastening unit located between a distal end of the side outer panel and the windshield.

In addition, the fastening unit may include an injected portion located on one edge of the windshield adjacent to the side outer panel and a molded portion configured to integrally surround a side surface of the injected portion and a distal end of the side outer panel.

The vehicle front pillar may further include a sealing portion located in a space between a distal end of the injected portion and the side outer panel.

The molded portion may include a protrusion located on one end of the molded portion facing the injected portion. The injected portion may have an inlet recess corresponding to the protrusion.

The protrusion may include a first protrusion facing the injected portion and a second protrusion inserted into the space defined between the distal end of the injected portion and the side outer panel.

The vehicle front pillar may further include an extension panel extending from the side outer inner panel, in a position in which the side outer inner panel and a roof panel face each other.

The injected portion may further include at least one protrusion protruding to adjoin the side outer panel.

A sealing portion may be provided between the protrusion and the molded portion so as to be located between the injected portion and the side outer panel.

The molded portion may be configured to surround an outer side surface of the injected portion.

Both ends of the reinforcing member may be in contact with the side outer inner panel and form a closed cross-section between the reinforcing member and the side outer inner panel.

One end of the reinforcing member, one end of side outer inner panel, and one end of the side outer panel may be located in contact with each other.

The windshield may include an inner recess portion. The fastening unit may be configured to surround an inner portion of the inner recess portion and an edge of the windshield.

According to the present disclosure, the following effects may be obtained from configurations to be described hereinafter as well as combinations and uses thereof.

According to the present disclosure, it is possible to provide a front pillar structure configured to improve a forward view, thereby improving user safety.

In addition, it is possible to provide a front pillar structure configured to block external rainwater or impurities, thereby preventing contaminations.

Furthermore, it is possible to provide a front pillar on which a windshield curved along the pillar surface can be more firmly seated.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Figure 1:
FIG. 1 is a view illustrating a front portion of a vehicle on which a windshield is mounted according to an embodiment of the present disclosure.

Hereinafter, embodiments of the present disclosure are described in more detail with reference to the accompanying drawings. The embodiments of the present disclosure may be variously modified in forms, and the scope of the present disclosure should not be construed as being limited to the embodiments described below. The embodiments are provided to more fully illustrate the present disclosure to those having ordinary skill in the art.

In addition, terms such as "module", "unit", and "panel", refer to elements respectively performing at least one function or operation. The "module", "unit", "panel", and the like may be realized as hardware or a combination of hardware.

It should be understood that, although the terms "first", "second", etc., may be used herein to describe various elements, these terms are only used to distinguish one element from another element, and these elements should not be limited by these terms.

Hereinafter, embodiments are described in detail with reference to the accompanying drawings. Throughout the drawings, the same reference numerals and symbols are used to designate the same or like components, and repeated descriptions thereof have been omitted.

FIG. 1 is a view illustrating a vehicle front pillar 200 on which a windshield 100 is mounted according to an embodiment of the present disclosure.

As illustrated in FIG. 1, the vehicle windshield 100 is fixedly located on the vehicle front pillar 200. In addition, the windshield 100, according to the present disclosure, is configured to surround at least portions of the front portion and the side portions of the vehicle. The windshield 100 is configured to be fastened to the front pillar 200 provided in a position in which the front surface and the side surface face each other. According to an embodiment of the present disclosure, the windshield 100 may be configured to surround the entirety of the front pillar 200.

In addition, the top edge of the windshield 100 is fastened to a roof panel and an extension panel 260 extending from the front pillar 200 is fastened to the roof panel 300.

The front pillar 200 may include a side outer panel 210, a side outer inner panel 220, and a reinforcing member 250. The front pillar 200 may be fixed by a fastening unit 230 located between each edge of the windshield 100 and the side outer panel 210.

The fastening unit 230 is located between each edge of the windshield 100 and the side outer panel 210, and may be formed by insert molding. In addition, the fastening unit 230 may include a sealing portion 500 located between a distal end of an injected portion 270 and the side outer panel 210. The fastening unit 230 may further include a molded portion 240 located on an outer side surface of the vehicle and configured to surround the injected portion 270 and the side outer panel 210.

The molded portion 240 may be provided in a position adjacent to a vehicle door and may extend along at least a portion of the outer side surface of the door in the longitudinal direction of the vehicle.

The molded portion 240 surrounding the outer side surface of the injected portion 270 is configured to first block contaminants or rainwater incoming externally from the vehicle. The sealing portion 500 located between the distal end of the injected portion 270 and the side outer panel 210 may be configured to second block contaminants or rainwater.

An interior trim 400 may be located on a portion of the front pillar 200 inside the vehicle and configured to prevent the front pillar 200 from being exposed. The interior trim 400 may be fastened to a roof trim along the front pillar 200. The other end of the interior trim 400 is configured to be in contact with the top end of a crush pad.

Figure 2:
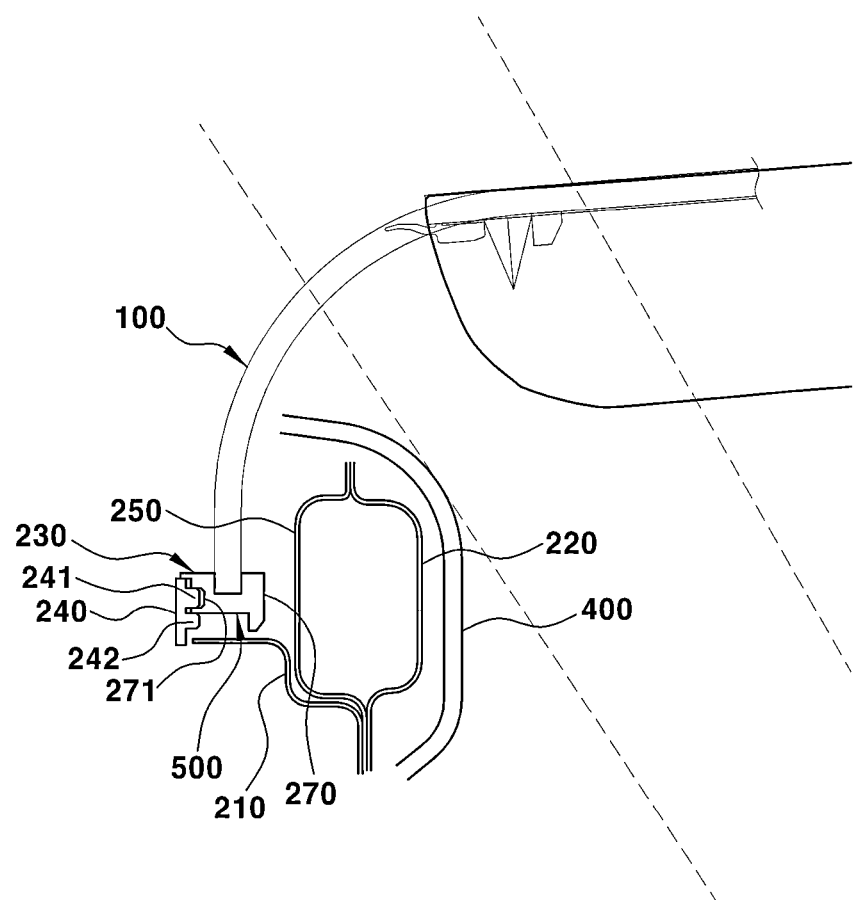
FIG. 2 is a cross-sectional view of the front pillar on which the windshield is mounted according to an embodiment of the present disclosure, taken along line A-A in FIG. 1.

Referring to FIG. 2, the vehicle front pillar 200, according to an embodiment of the present disclosure, is concealed by the windshield 100 so as not to be exposed to the outside when viewed from the outside front of the vehicle. In addition, the windshield 100 is configured to be curved in a shape matching that of the front pillar 200.

In other words, the windshield 100 is configured to extend further in the transverse direction of the vehicle than a windshield of the related art. Each end portion of the extended windshield 100 is configured to surround at least a portion of the front pillar 200.

The front pillar 200, according to an embodiment of the present disclosure, includes the side outer panel 210 disposed outside in the transverse direction of the vehicle, the side outer inner panel 220 located inside the side outer panel 210, and the reinforcing member 250 located between the side outer inner panel 220 and the side outer panel 210.

The cross-section of the side outer panel 210 is bent in the transverse direction of the vehicle, with one bent surface thereof being located in a position adjacent to the corresponding edge of the windshield 100. More particularly, one surface of the side outer panel 210 is configured to be in contact with the corresponding edge of the windshield 100.

At the rear end of the vehicle, the side outer panel 210, the side outer inner panel 220, and the reinforcing member 250 are located to be in contact with each other. The side outer panel 210 is bent at a predetermined angle in the transverse direction of the vehicle. The side outer inner panel 220 and the reinforcing member 250 are configured to form a closed cross-section in which a space having a predetermined length or width is defined.

According to an embodiment of the present disclosure, the side outer inner panel 220 and the reinforcing member 250 forming the closed cross-section are formed to have a quadrangular cross-section (e.g., an oblong or rectangular cross-section) and are configured to absorb impact externally applied thereto. Here, the shape defining the closed cross-section is not limited.

The top ends of the side outer inner panel 220 and the reinforcing member 250 forming the closed cross-section are in contact with each other. More particularly, the side outer inner panel 220 and the reinforcing member 250 located on the top and bottom ends of the closed cross-section may be formed by spot welding, a press method, or the like.

In addition, the side outer inner panel 220 and the reinforcing member 250 may be prepared as separate panels and then formed into intended shapes by at least one of the above-mentioned methods, respectively, before being welded to form the closed cross-section.

The fastening unit 230 includes the injected portion 270 fabricated by insert molding and located on one edge of the windshield 100 and the sealing portion 500 located on one end of the injected portion 270 and between the side outer panel 210 and the injected portion 270.

The injected portion 270 may include a protrusion facing the side outer panel 210. The injected portion 270 may be located on both side surfaces of a space in which the sealing portion 500 is located and be in contact with the side outer panel 210. The protrusion may be at least one protrusion facing the side outer panel 210 and may be provided in a position adjacent to the sealing portion 500.

In addition, the molded portion 240 configured to surround the outer surfaces of the injected portion 270 is further provided. The molded portion 240 includes a protrusion inserted into an inlet recess 271 located in the injected portion 270. More particularly, according to an embodiment of the present disclosure, the molded portion 240 includes two different protrusions 241 and 242. The molded portion 240 may be configured such that the first protrusion 241 is inserted into the inlet recess 271 formed in a side surface of the injected portion 270 and the second protrusion 242 is inserted into the space between the side outer panel 210 and the injected portion 270. The surface of the molded portion 240 facing the outer surface of the vehicle may be subjected to surface treatment, such as paining or chromium (Cr) coating.

According to another embodiment of the present disclosure, the injected portion 270 may be provided on the outer surface of the vehicle to be exposed and may be configured to have a surface extending from the outermost surface of the windshield 100. In addition, the injected portion 270 may include two protrusions spaced apart from both side surfaces of the sealing portion 500. The protrusions may work in concert with the sealing portion 500 to prevent rainwater or impurities from infiltrating into the front pillar 200.

Figure 3:
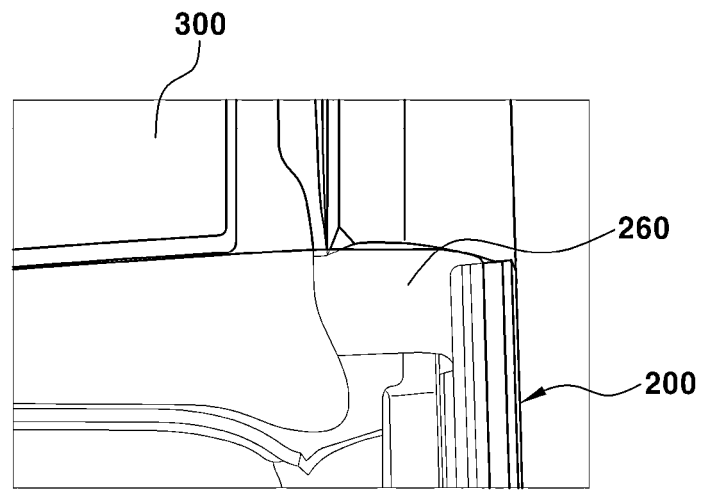
FIG. 3 is a view illustrating a fastening structure of the roof panel adjacent to the front pillar according to an embodiment of the present disclosure.

FIG. 3 illustrates a fastening structure of the front pillar 200 located adjacently to the roof panel 300 according to an embodiment of the present disclosure.

The top end of the front pillar 200 is configured to face the roof panel 300, and further includes the extension panel 260 located between the front pillar and the roof panel 300.

More particularly, the extension panel 260 is configured to extend from the side outer inner panel 220 to be inserted into, and further extend through the roof panel 300.

The extension panel 260 is configured to have one surface facing the windshield 100. The extension panel 260 has a seating surface on which the windshield 100 is seated. The seating surface is formed in a space between the front pillar 200 and the roof panel 300.

The extension panel 260 is configured to be fastened to at least a portion of the front pillar 200 and the roof panel 300 and is configured such that at least a portion thereof extends in the transverse direction along the roof panel 300. Thus, the windshield 100 located on the extension panel 260 may be configured such that a sealer is located thereon. The sealer is located on the extension panel 260 and is configured to support the windshield 100.

In other words, the extension panel 260 may be configured to be located inside the bottom end of the side outer panel 210 adjacent to the side surface of the roof panel 300 and an adjacent area of the roof panel 300 on which the windshield is located.

As described above, the front pillar 200, according to the present disclosure, may provide a structure on which the windshield 100 is bent and extends along the edge of the pillar on which it is to be seated.

Figure 4:
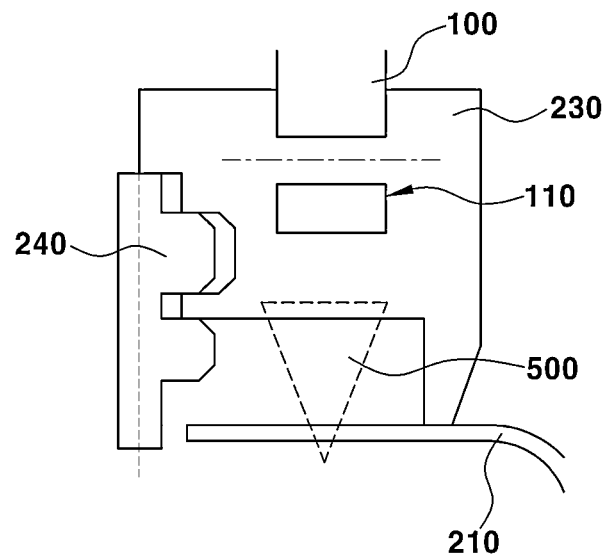
FIG. 4 is a side view illustrating a situation in which the windshield and the fastening unit are injection-molded according to an embodiment of the present disclosure.

FIG. 4 illustrates a vehicle front pillar including the windshield 100 provided integrally with the fastening unit 230.

According to an embodiment of the present disclosure, the fastening unit 230 is injection-molded integrally with the windshield 100 to be fastened to the molded portion 240 of the side outer panel 210. In other words, the fastening unit 230 may be formed integrally with the windshield 100 by insert molding. Furthermore, the sealing portion 500 located between the bottom surface of the molded fastening unit 230 and the side outer panel 210 may be further provided.

In addition, as illustrated in FIG. 4, recesses 110 are provided on both edges of the windshield 100. Therefore, when the fastening unit 230 and the windshield 100 are injection-molded integrally, the fastening unit 230 may be fixed to the recesses 110 of the windshield 100.

Figure 5:
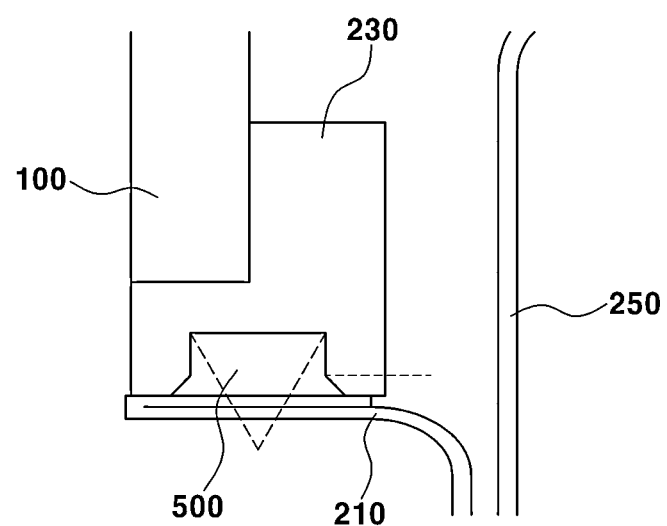
FIG. 5 is a view illustrating a hemming area of the side outer panel facing the fastening unit according to an embodiment of the present disclosure.

FIG. 5 illustrates a hemming shape of the side outer panel 210 facing the fastening unit 230.

As illustrated in FIG. 5, the side outer panel 210 in contact with the fastening unit 230 is configured such that the distal end thereof is bent. The side outer panel 210 is configured to reduce scratches occurring in the fastening unit 230 that is an insert molded component.

In addition, the fastening unit 230 does not include the molded portion 240 and is configured such that the outer surface thereof is coplanar with the outermost surface of the windshield 100. Accordingly, the windshield 100 and the fastening unit 230 exposed to the outside of the vehicle may provide planar surfaces appearing as an integrated surface.

The above description is illustrative of the present disclosure. Also, the above description is intended to illustrate and explain the embodiments of the present disclosure and the present disclosure may be used in various other combinations, modifications, and environments. In other words, the present disclosure may be changed or modified within the scope of the inventive concept disclosed herein, within the equivalent scope of the disclosure, and/or within those having ordinary skill and knowledge in the art. The described embodiments illustrate the best state of the art to implement the technical idea of the present disclosure. Various changes may be made thereto as being demanded for specific applications and uses of the present disclosure.

Accordingly, the above description is not intended to limit the present disclosure to the embodiments. Also, the appended claims should be construed as encompassing such other embodiments.

What is claimed is:

1. A vehicle front pillar comprising:
   a side outer panel located on a side of a vehicle;
   a side outer inner panel spaced apart from the side outer panel by a predetermined space;
   a reinforcing member located between the side outer panel and the side outer inner panel;
   a windshield located to surround at least a portion of an outer portion of the reinforcing member; and
   a fastening unit located between a distal end of the side outer panel and the windshield.

2. The vehicle front pillar according to claim 1, wherein the fastening unit comprises:
   an injected portion located on one edge of the windshield adjacent to the side outer panel; and
   a molded portion configured to integrally surround a side surface of the injected portion and a distal end of the side outer panel.

3. The vehicle front pillar according to claim 2, further comprising:
   a sealing portion located in a space between a distal end of the injected portion and the side outer panel.

4. The vehicle front pillar according to claim 2, wherein the molded portion comprises a protrusion located on one end of the molded portion facing the injected portion, and the injected portion comprises an inlet recess corresponding to the protrusion.

5. The vehicle front pillar according to claim 4, wherein the protrusion comprises:
   a first protrusion facing the injected portion; and
   a second protrusion inserted into the space defined between the distal end of the injected portion and the side outer panel.

6. The vehicle front pillar according to claim 1, further comprising:
   an extension panel extending from the side outer inner panel in a position in which the side outer inner panel and a roof panel face each other.

7. The vehicle front pillar according to claim 1, wherein an injected portion of the fastening unit comprises at least one protrusion protruding to adjoin the side outer panel.

8. The vehicle front pillar according to claim 7, wherein a sealing portion is provided between the at least one protrusion and a molded portion of the fastening unit so as to be located between the injected portion and the side outer panel.

9. The vehicle front pillar according to claim 1, wherein a molded portion of the fastening unit is configured to surround an outer side surface of an injected portion of the fastening unit.

10. The vehicle front pillar according to claim 1, wherein both ends of the reinforcing member are in contact with the side outer inner panel and form a closed cross-section between the reinforcing member and the side outer inner panel.

11. The vehicle front pillar according to claim 1, wherein one end of the reinforcing member, one end of side outer inner panel, and one end of the side outer panel are located in contact with each other.

12. The vehicle front pillar according to claim 1, wherein the windshield comprises an inner recess portion, and wherein the fastening unit is configured to surround an inner portion of the inner recess portion and an edge of the windshield.

* * * * *